L. W. BUGBEE.
CUTTER.
APPLICATION FILED FEB. 19, 1917.
Reissued June 18, 1918.
14,486.
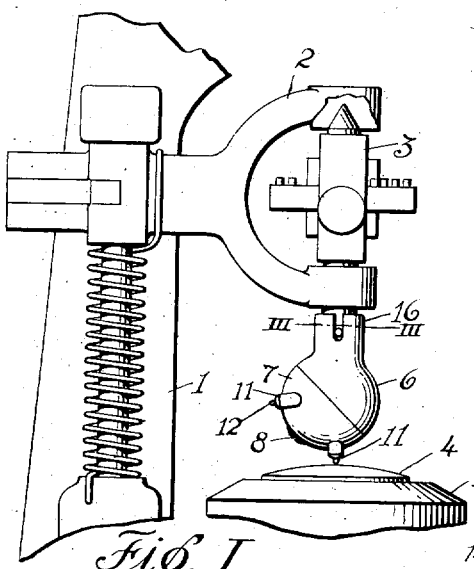
Fig. I
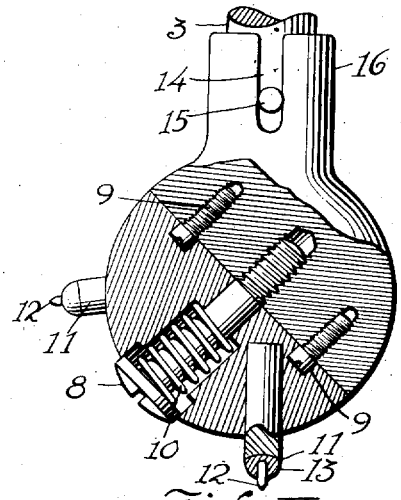
Fig. II
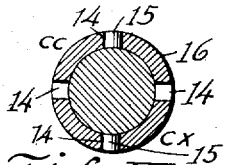
Fig. III
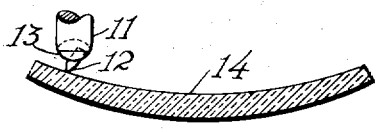
Fig. IV
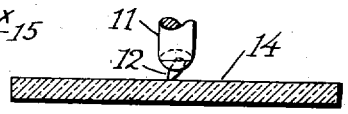
Fig. VI
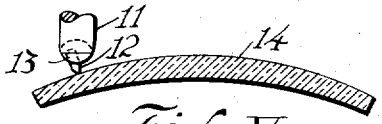
Fig. V
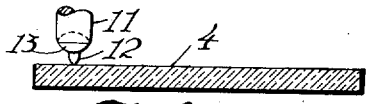
Fig. VII
INVENTOR
Lucian W. Bugbee
BY
H. H. Styll & A. L. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

CUTTER.

14,486. Specification of Reissued Letters Patent. Reissued June 18, 1918.

Original No. 1,202,156, dated October 24, 1916, Serial No. 90,129, filed April 10, 1916. Application for reissue filed February 19, 1917. Serial No. 149,692.

*To all whom it may concern:*

Be it known that I, LUCIAN W. BUGBEE, a citizen of the United States, residing at Southbridge, in the county of Worcester and State of Massachusetts, have invented new and useful Improvements in Cutters, of which the following is a specification.

This invention relates to improvements in lens cutting machines, and has particular reference to improvements in the tool spindle and associated parts forming the actual cutting mechanism.

One of the leading objects of the invention is the provision of an improved multiple diamond holder which shall contain in compact form the necessary cutters for varying curvatures of lenses.

A further object of the invention is the provision of improved and efficient means permitting of the ready interchangement of the cutting points, while securely locking any elected point in operative position.

A further object of the invention is the provision of improved means whereby a single cutting point may be readily adjusted to satisfactorily operate upon different curvatures of lenses when desired.

Other objects and advantages of my improved construction should be readily apparent by reference to the following specification taken in connection with the accompanying drawings forming a part thereof, and it will be understood that I may make any modifications in the specific details of construction shown and described within the scope of the appended claims without departing from or exceeding the spirit of my invention.

Figure I represents a fragmentary view of a lens cutter equipped with my improved construction.

Fig. II represents an enlarged sectional view of my cutter head.

Fig. III represents a section view on the line III—III of Fig. I.

Fig. IV represents a diagrammatic view of the adjustment for operating on concave surfaces.

Fig. V represents a similar view of the adjustment for operating on convex surfaces.

Fig. VI represents a similar view when used in connection with plano surfaces.

Fig. VII represents a view at right angles to Fig. VI.

In the drawings, in which similar characters of reference are employed to denote corresponding parts throughout the several views, the numeral 1 designates the main frame of the cutter, carrying the swinging arm 2 in which is mounted the tool spindle 3, these parts being of any desired construction, although being illustrated as the construction shown in my Patent 1,187,034 of June 13, 1916, of which the application upon which the present application is based is a division.

Carried by the lower end of the spindle 3 and movable therewith under the guidance of a suitable pattern as the latter is rotated, is the tool or cutter for operating on the lens or other device 4 carried by the table 5. In the cutting or marking of glass for example, it has been found the most efficient results can be obtained when the cutting or marking point is substantially normal to the surface being operated upon. Prior to this invention it has, therefore, been necessary to either employ a plurality of machines for operating on different surfaces, such as concave, convex and the like, or else to mount the cutting point for pivotal movement. The first form is disadvantageous from a viewpoint of expense, while the latter involves a looseness and consequent liability of insecurity of parts. The present machine, however, does away with the various difficulties hitherto experienced.

Carried by the lower end of the spindle 3, is a head 6 having its lower surface cut at an angle, while fitting tightly against said lower surface is the supplemental head 7 rotatably mounted on the stud 8, the two heads 6 and 7 being rigidly held in desired adjusted relation by the dowels 9, a spring 10 forcing the two normally together but permitting of their disengagement by direct pull sliding the dowels out of interlocking relation, after which the two parts may be relatively rotated around the stud 8. Carried by the said head 7 are a plurality of shanks 11 each bearing a cutting point 12 which may be either a diamond or other desired cutter or marker. In the case of the diamond the same is mounted in a segment of a sphere 13 whose curvature has as its center the operating point, the said portion 13 being secured in the end of the shank 11 as by soft solder or the like, whereby heating will serve to soften the attachment and allow of adjustment of the cutter relative to the shank to vary its angle without varying the position of the point which is at all times in line with the axis of the shank.

It will be noted by reference to the drawings that the shanks are so disposed that when the head 7 is thrown to bring one of the shanks into operative position the axis of the shank and the marking point will be exactly alined with the axis of the spindle 3 extended.

In use there may be any desired number of shanks 11 mounted in the head 7, for purposes of illustration three having been shown; one with a point set in position to best operate on concave surfaces, a second set to best operate on convex surfaces, and the third being arranged for plano surfaces. To further increase the efficiency of the machine, however, as when one of the points 12 has been dulled or broken, or for some other reason it is undesirable to turn the head 7 or in those events where it is desired to use but a single tool or cutting member in place of the three, the head 6 is provided with a tubular portion or sleeve 16 fitting over the lower end of the spindle 3 and being locked against accidental rotation thereon as by means of the slot 14 and pin 15 or any mechanical equivalent thereof.

The purpose and advantages of this construction will be best understood by reference to Figs. III to VII inclusive, from which it will be noted that there are four of the slots 14 so that the head 6 and shank 3 may be locked with four different relative adjustments, three of these adjustments being preferable in actual use. These adjustments may be suitably designated on the tubular portion 16, for convenience and understanding the same being indicated at the side of the sleeve in Fig. III, it being understood that these designations are in practice placed directly on the sides of the sleeve. As previously mentioned, the point 12 is disposed at an angle, as illustrated in Figs. IV, V and VI. When it is desired to cut a concave surface the head 6 is suitably adjusted on the spindle 3 to bring the point into the position indicated in Fig. IV, or substantially normal to the concave surface. When cutting a convex surface or marking the same the head 6 is given a half rotation bringing the point into the position shown in Fig. V, the position of the point as before mentioned being axial at all times with the spindle 3 so that the size of the device circumscribed and the position of the point is in nowise varied by said adjustment. When it is desired to cut a plano surface, but a quarter turn adjustment is given, this bringing the point normal, as indicated in Fig. VI, the head being preferably so set, however, that the point trails, as indicated in Fig. VII, rather than digging in as would be the case where the head revolves through an arc of 180 degrees from the position indicated in Fig. VII. It will thus be seen that on account of the relative rotative adjustment of the head 6 and the shank 3, the single cutting point 12 may be adjusted as desired according to the various forms of surfaces being operated upon.

From the foregoing description taken in connection with the drawings, it will thus be seen that I have provided an extremely compact, efficient and desirable construction, in which a plurality of cutting points are provided, any one of which may be shifted into operative position either by movement of the lower tool bearing head, or turret member, or by movement of the complete device relative to the spindle without change of points. By these slight adjustments cutting of convex, concave or plano lenses may be readily accomplished without in anywise varying the size of lens cut when under guidance of a certain style of former, and that I have consequently provided a novel and extremely efficient form of machine for the desired purpose.

I claim:

1. In a machine of the character described, the combination with a tool spindle, of a tool head mounted thereon, and having a face inclined with respect to the spindle, a stud projecting centrally from said face, a second tool head rotatably mounted on the stud, interlocking members on the said heads for securing the same in relative rotatively adjusted position, means for resiliently holding the heads in said interlocking relation while permitting of disengagement thereof when desired, and a plurality of tools carried by the second head, each of which may be brought into the same predetermined relation to the tool spindle by relative rotation of the head.

2. In a lens cutter, the combination with a cutter spindle, of means for pivotally supporting the spindle, former engaging members carried by the upper portion of the spindle, a former engaging shoe upon the spindle, a head on the lower portion of the spindle, a supplemental head pivotally secured to the main head, and a plurality of cutters so mounted in the supplemental head that each of the operative portions of the cutters at one adjustment of the supplemental head will lie in the same relative position to the former engaging shoe, substantially as and for the purpose described.

3. In a device of the character described, the combination with the tool arm, of a head carried thereby, a second head mounted for rotative adjustment relative to the first, and a plurality of tools carried by said second head and provided with cutting points, said tools being so arranged that the operative point of each when in one adjusted position will lie in axial alinement with the main tool spindle, substantially as and for the purpose described.

4. In a machine of the character described, the combination with a tool spindle, of a head carried thereby, and rotatable about the axis thereof, a tool shank carried by the head and having a tool angularly mounted thereon, the point of the tool extending into alinement with the axis of the tool spindle extended, means for locking the head and tool at a plurality of points about the axis of the tool spindle, said head having means thereon for indicating the result of said adjustment.

5. In a machine of the character described, the combination with a tool spindle, of a tool head mounted thereon and having an inclined face, a stud projecting centrally from said face, a second tool head rotatably mounted on the stud, interlocking members on the said heads for securing the same in relative rotatively adjusted position, means for resiliently holding the parts in said interlocking relation while permitting of disengagement thereof when desired, and a plurality of tools carried by the second head, each of which may be brought into the same predetermined relation to the tool spindle by relative rotation of the head, and means for rotating the two heads in unison about an axis at an angle to that of the stud, substantially as and for the purpose described.

6. In a device of the character described, the combination with a tool spindle, of a main head rotatably mounted on the spindle, means for locking the main head at any one of a plurality of positions on said spindle, an auxiliary head carried by the main head, and turning about an axis intersecting the axis of the spindle, and a plurality of cutters carried by the auxiliary head and adapted to be moved into axial alinement with the spindle upon suitable movement of the auxiliary head, substantially as and for the purpose described.

7. In a device of the character described, the combination with a tool spindle, having a former engaging portion and a main head, of an auxiliary head carried by the main head and mounted for movement about an axis different from the axis of the spindle, and a plurality of cutters carried by the last mentioned head and so disposed in the head that the operative portion of each cutter will at one adjustment of the head be brought into axial alinement with the spindle, substantially as and for the purpose described.

8. In a device of the character described, the combination with a tool spindle, of a main head rotatably mounted upon the spindle, means for locking the main head in any one of a plurality of positions on said spindle, an auxiliary head carried by the main head and turning about an axis intersecting the axis of the spindle, interlocking members on the said heads for securing the same in relative rotatably adjusted position, means for resiliently holding the heads in said interlocking relation while permitting of disengagement thereof when desired, and a plurality of cutters carried by the auxiliary head and adapted to be moved into axial alinement with the spindle upon suitable movement of the auxiliary head substantially and for the purpose described.

In testimony whereof I hereunto affix my signature.

LUCIAN W. BUGBEE.

Copies of this patent may be obtained for five cents each, by addressing the "Commissioner of Patents, Washington, D. C."